(12) United States Patent
John

(10) Patent No.: US 11,571,850 B2
(45) Date of Patent: Feb. 7, 2023

(54) BUILDING PLATFORM FOR BUILDING UP A WORKPIECE IN LAYERS OR CONTINUOUSLY

(71) Applicant: Ivoclar Vivadent AG, Schaan (LI)

(72) Inventor: Hendrik John, Buchs (CH)

(73) Assignee: Ivoclar Vivadent AG, Schaan (LI)

(*) Notice: Subject to any disclaimer, the term of this patent is extended or adjusted under 35 U.S.C. 154(b) by 0 days.

(21) Appl. No.: 17/233,798

(22) Filed: Apr. 19, 2021

(65) Prior Publication Data
US 2021/0331378 A1  Oct. 28, 2021

(30) Foreign Application Priority Data
Apr. 22, 2020 (DE) .................. 102020002430.0

(51) Int. Cl.
| | |
|---|---|
| *B29C 64/124* | (2017.01) |
| *B33Y 10/00* | (2015.01) |
| *B33Y 30/00* | (2015.01) |
| *B33Y 50/02* | (2015.01) |
| *B29C 64/264* | (2017.01) |
| *B29C 64/245* | (2017.01) |
| *B29C 64/393* | (2017.01) |

(52) U.S. Cl.
CPC .......... *B29C 64/124* (2017.08); *B29C 64/245* (2017.08); *B29C 64/264* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/124; B29C 64/264; B29C 64/245; B29C 64/393; B33Y 10/00; B33Y 30/00; B33Y 50/02
USPC ......................................... 264/40.1; 425/375
See application file for complete search history.

(56) References Cited

U.S. PATENT DOCUMENTS

| | | | |
|---|---|---|---|
| 8,623,264 B2 | 1/2014 | Rohner et al. | |
| 2010/0283188 A1* | 11/2010 | Rohner | A61C 13/0013 264/401 |
| 2011/0310370 A1 | 12/2011 | Rohner et al. | |
| 2012/0248657 A1* | 10/2012 | Ebert | B29C 64/124 264/401 |
| 2014/0044824 A1 | 2/2014 | Rohner et al. | |

* cited by examiner

*Primary Examiner* — Joseph S Del Sole
*Assistant Examiner* — Lawrence D. Hohenbrink, Jr.
(74) *Attorney, Agent, or Firm* — Ann M. Knab; Thad McMurray

(57) ABSTRACT

The present invention relates to a building platform (100) for building up a workpiece (200) in layers or continuously by stereolithography, comprising: a rear illumination device (101-1) for illuminating a layer (103-n) from a rear side; a photosensor (105) for detecting a light intensity of a light from a front illumination device (101-2) through the layer (103-n) and/or a material and/or a deflecting mirror; and a control device (107) for activating the rear illumination device (101-1) when the detected light intensity of the front illumination device (101-2) is above a predetermined threshold.

19 Claims, 4 Drawing Sheets

BUILDING PLATFORM FOR BUILDING UP A WORKPIECE IN LAYERS OR CONTINUOUSLY

CROSS-REFERENCE TO RELATED APPLICATIONS

This application claims priority to German patent application No. 102020002430.0 filed on Apr. 22, 2020, the disclosure of which is incorporated herein by reference in its entirety.

TECHNICAL FIELD

The present invention relates to a building platform for building up a workpiece in layers or continuously by stereolithography, to a stereolithography device comprising a building platform, and to a method for building up a workpiece in layers or continuously using a building platform.

BACKGROUND

Because of the absorption properties of light-curing materials that are used for a stereolithography process, the light output of the mask projection is in some cases not sufficient to generate sufficient adhesion of the workpiece to the building platform, which overcomes the separating forces at the trough floor so that the component keeps adhering to the trough floor during a separation attempt. This can be achieved by way of an active and temporary increase in the adhesion of the base layers to the building platform by means of rear illumination at the building platform surface.

EP 2 337 667 B1 and corresponding US2011310370A1, US2014044824A1, U.S. Pat. No. 8,623,264B2, and U.S. Pat. No. 9,067,359B2, which US publications are hereby incorporated by reference, relate to a device for processing light-polymerizable material. A rear illumination device integrated into the building platform is connected to the control system of the printer and controlled by the printer control system for the first layers in the building process.

SUMMARY

The technical object of the present invention is to provide a modularly replaceable, autonomous building platform, which operates independently of the printer control system and which, in a simple manner, prevents undesired release of built-up layers from the building platform.

This object is solved by subject-matter according to the independent claims. Advantageous embodiments are subject to the dependent claims, the description and the drawings.

In a first aspect, this technical object is solved by a building platform for building up a workpiece in layers or continuously by stereolithography, comprising a rear illumination device for illuminating a layer from a rear side; a photosensor for detecting a light intensity of a light from a front illumination device through the layer and/or a material and/or a deflecting mirror; and a printer-independent control device for activating the rear illumination device when the detected light intensity of the front illumination device is above a predetermined threshold. This achieves for example the technical advantage that the first built-up layers are illuminated and cured from two opposite sides and the adhesion to the building platform increases.

In a second aspect, this technical object is solved by a building platform for building up a workpiece in layers or continuously by stereolithography, comprising a rear illumination device for illuminating a layer from a rear side; a detection device for detecting production of a first layer; and a printer-independent control device for activating the rear illumination device when the production of the first layer is detected. This achieves the same technical advantages as the building platform according to the first aspect.

The detection device may for example comprise a mechanical probe or a distance sensor, which is integrated into the building platform and is triggered for the first layer. The detection device may be formed to activate a counter which counts the number of built-up layers and, below a predetermined value, activates the rear illumination device, for example for the first five layers. At the start of the building process, the building platform may be guided backwards onto a probe. Activation may take place by near-field communication (NFC) up to a particular height or particular number of layers.

In a technically advantageous embodiment of the building platform, the rear illumination device is formed by an LED matrix. This achieves for example the technical advantage that large-area illumination and curing are achieved with a low energy expenditure. Other examples include a diffusing screen sidewardly illuminated by LED, area backlight, or light guide material.

In a further technically advantageous embodiment of the building platform, the light intensity or illumination time of the rear illumination device can be set using a potentiometer or by an internal control system.

This achieves for example the technical advantage that the light intensity can be controlled manually or automatically and can be adapted to the material used.

In a further technically advantageous embodiment of the building platform, the number of rear-illuminated layers can be controlled using a counter. This achieves for example the technical advantage that the rear illuminations only have to be triggered for the first layer, in case the further layers absorb too much light and the photosensor is no longer activated. Even if there is too little light, further rear illuminations may additionally be conducted until the counter reaches a predetermined number of layers.

In a further technically advantageous embodiment of the building platform, the building platform comprises an electrical energy store for storing energy for the rear illumination device. This achieves for example the technical advantage that the building platform can provide the required energy autonomously and without an external connection cable.

In a further technically advantageous embodiment of the building platform, the energy store is a rechargeable and/or replaceable battery. This achieves for example the technical advantage that the energy store can be reused.

In a further technically advantageous embodiment of the building platform, the photosensor is a photodiode which is tuned to the wavelength range of the front illumination. The photodiode is for example a silicon carbide photodiode or a silicon photodiode. This achieves for example the technical advantage that the light intensity can be determined to a high precision.

In a further technically advantageous embodiment of the building platform, the photodiode is sensitive in a wavelength range of the front illumination device in the UVA range or in the blue light range. This achieves for example the technical advantage that suitable wavelengths for curing the material can be detected.

In a further technically advantageous embodiment of the building platform, the predetermined threshold for activating the rear illumination can be set by a user. This achieves for example the technical advantage that the threshold can be adapted to the material used.

In a further technically advantageous embodiment of the building platform, the building platform with rear illumination device can be inserted modularly into a stereolithography device. This achieves for example the technical advantage that the building platform can be replaced.

In a further technically advantageous embodiment of the building platform, the rear illumination device can be modularly placed on or slid onto the building platform. This achieves for example the technical advantage that an illumination device can be inserted or replaced selectively or an illumination device particularly suitable for the material can be used.

In a further technically advantageous embodiment of the building platform, the building platform can be operated wirelessly. This achieves for example the technical advantage that the construction and handling of the building platform are simplified.

In a third aspect, this technical object is solved by a stereolithography device comprising a building platform according to the first or second aspect. The stereolithography device achieves the same technical advantages as the building platform according to the first aspect.

In a technically advantageous embodiment of the stereolithography device, the stereolithography device is formed so that part of the light of the front illumination device, which is used for illuminating the first layer, is deflected onto the photosensor, and the rear illumination device is thus activated. This achieves for example the technical advantage that the rear illumination is indirectly activated by the building process/illumination process itself, and no direct control by the printer is required.

In a fourth aspect, this technical object is solved by a stereolithography method for building up a workpiece in layers or continuously using a building platform, comprising the steps of illuminating a layer from a front side using a front illumination device; detecting a light intensity of a light from the front illumination device through the layer and/or a material and/or via a deflecting mirror using a photosensor; and activating the rear illumination device using a printer-independent control device if the detected light intensity of the front illumination device is above a predetermined threshold. The method achieves the same technical advantages as the building platform according to the first aspect.

In a fifth aspect, this technical object is achieved by a stereolithography method for building up a workpiece in layers or continuously using a building platform, comprising the steps of detecting production of a first layer using a detection device; and activating the rear illumination device using a printer-independent control device when the production of the first step is detected.

In a technically advantageous embodiment of the method, the activation of the rear illumination device is carried out for a predetermined number of layers and/or using an adjusted illumination duration for each layer. This achieves for example the technical advantage that the degree of polymerisation of the material cured at the rear can be controlled to a higher precision.

In a further technically advantageous embodiment of the method, a height of the building platform is taken into account for the building process to determine the start position of the building platform and to set a predetermined layer thickness of the layer. This achieves for example the technical advantage that, even if the building platform is changed, a target layer thickness can be maintained.

BRIEF DESCRIPTION OF THE DRAWINGS

Embodiments of the invention are shown in the drawings and are described in greater detail in the following.

In the drawings.

DETAILED DESCRIPTION

Figure 1:
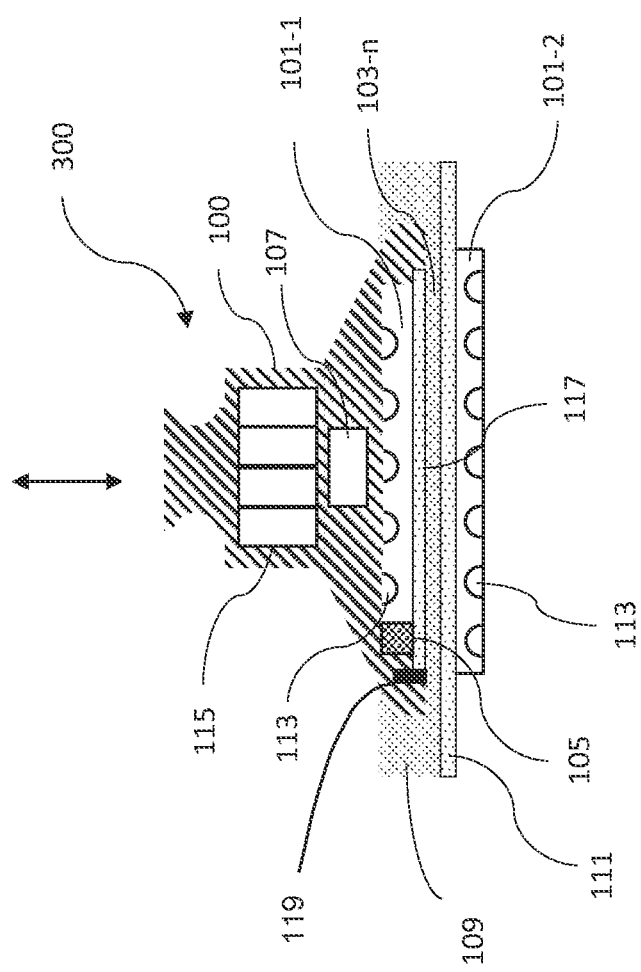
FIG. 1 shows a schematic state of a building platform in a stereolithography method.

FIG. 1 shows a cross section of a schematic state of a building platform 100 in a stereolithography method. The building platform 100 is used for building up a workpiece 200 in layers or continuously by stereolithography. For this purpose, the lower face of the building platform 100 is located in a viscous material 109 which is curable using light. If a layer is cured, the building platform is moved away from the illumination plane and moved again forward to the following layer thickness so that viscous material can flow back anew to be subsequently cured. The material 109 is for example a ceramic slurry used for production a dental restoration. In general, however, other materials may also be processed.

The building platform 100 comprises a rear illumination device 101-1 for illuminating a layer 103-$n$ of the material 109 from a rear side. The illumination device 101-1 comprises a plurality of LEDs 113, which are arranged behind a transparent surface 117. The LEDs 113 are for example capable of emitting light of a wavelength in the range of 220 to 500 nm. Maxima in the spectrum may be for example at 365 nm, 385 nm, 405 nm or 460 nm. In general, however, other wavelengths may also be used.

As a result of the rear illumination, the material 109 is cured directly on the transparent surface 117 of the building platform 100 and forms a layer which adheres firmly to the building platform (burn-in layer). As a result of this measure, undesired release of the workpiece from the building platform 100 can be prevented. The light intensity and/or illumination time of the rear illumination device 101-1 can be set for each layer using a potentiometer, or automatically customised for each layer using an internal control device.

The building platform 100 comprises an electrical energy store 115 for storing energy for the rear illumination device 101-1. As a result of this energy store 115, the rear illumination device 101-1 can be supplied with electrical energy autonomously, without a cable having to be passed into the building platform 100 for this purpose. The electrical energy store 115 may be for example a battery pack or accumulator pack.

On the opposite side of the building platform 100, the stereolithography device 300 comprises a front illumination device 101-2. The front illumination device 101-2 comprises a digital projection unit 113, which is arranged below a transparent base 111. The front illumination device 101-2 serves to cure the material in layers through the transparent trough base from the opposite side of the building platform. Using the projection unit 113, any desired light patterns can be projected onto the material. For this purpose, the projection unit 113 may comprise a digital micromirror device—DMD—or a liquid crystal display—LCD.

The building platform 100 comprises a photosensor 105, which is suitable for detecting the light intensity of the light from the front illumination device 101-2 through the material 109. The photosensor 105 may for example be formed by a photodiode. The more layers the built-up workpiece has, the lower the light intensity detected by the photosensor 105. The photosensor 105 is positioned in a corner of the building field (=illumination field) and can react to the illumination of the layer 103.

This effect can be exploited to activate the rear illumination device 101-1 only for the first few layers 103-n so that, on the one hand, unnecessary illumination of already cured layers on the transparent surface 117 is prevented and, on the other hand, an unnecessarily large number of layers are not cured over a large area, consuming material unnecessarily. In addition, electrical energy is saved. For this purpose, the building platform 100 comprises an electronic control device 107, which activates the rear illumination device 101-1 only when the detected light intensity of the front illumination device 101-2 is above a predetermined threshold. The threshold may be set to any desired value. As a result, the energy store 115 of the building platform 100 can be used for longer. If the detected light intensity is below the predetermined threshold, i.e. if already a particular number of layers are present, the rear illumination device 101-1 is no longer activated. Moreover, the number of layers to be illuminated at the rear side can be controlled using a settable counter. The counter counts the number of built-up layers from the start. Up to a predetermined number of built-up layers, the rear illumination device 101-1 is activated in each case.

Figure 2:
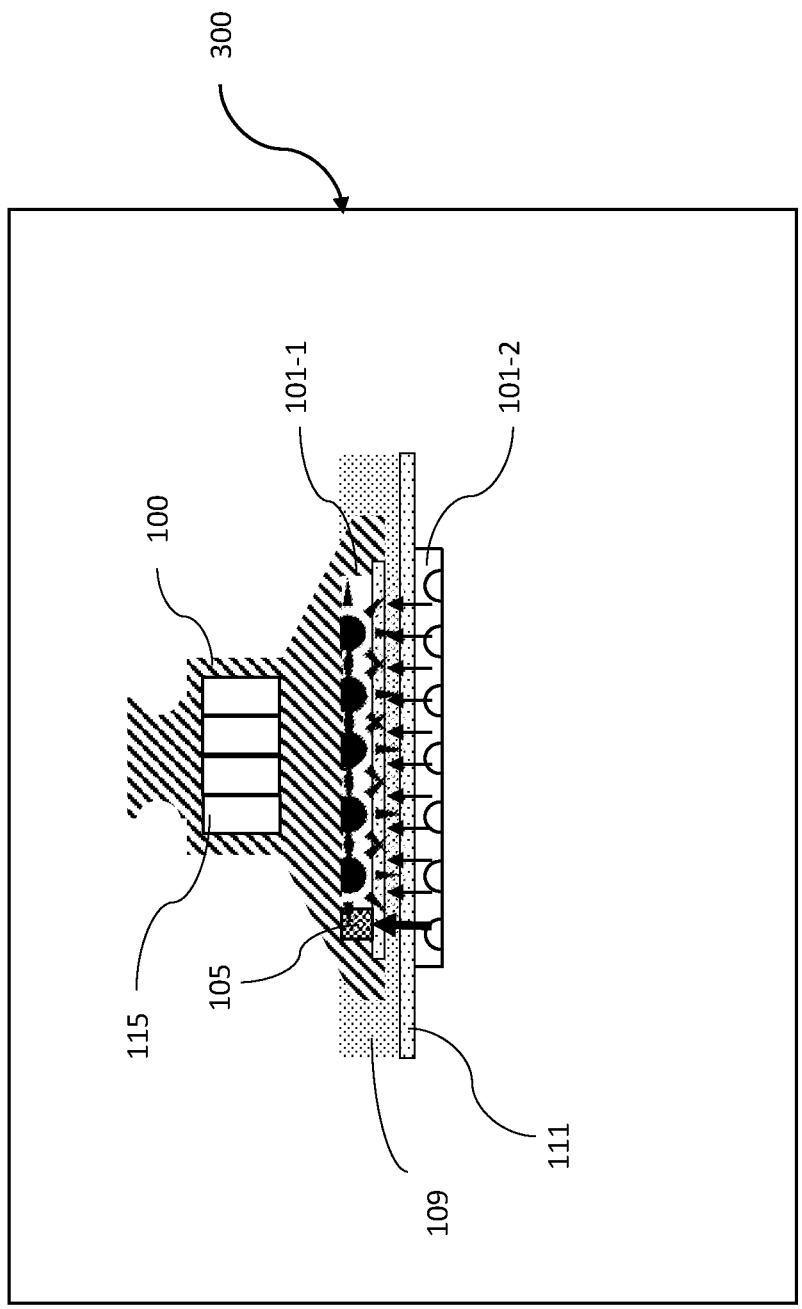
FIG. 2 shows a further schematic state of a building platform in a stereolithography method.

FIG. 2 shows a further schematic state of the building platform 100 in a stereolithography method. In this case, the first layer of the workpiece is being built up. Part of the light from the front illumination device 101-2 is incident on the photosensor 105 through the material.

The photosensor 105 detects a high light intensity of the front illumination device 101-2, since only a single material layer is present. Only a small part of the light passing through the material layer is absorbed thereby. As the number of layers increases, the light intensity decreases accordingly. Since for a low number of layers this light intensity is above the predetermined threshold, the rear illumination device 101-1 is activated as a reaction. As a result, the layer is illuminated over the entire area from the rear side as well as from the front side depending on the component. This results in a layer (burn-in layer) which adheres firmly to the building platform 100.

Figure 3:
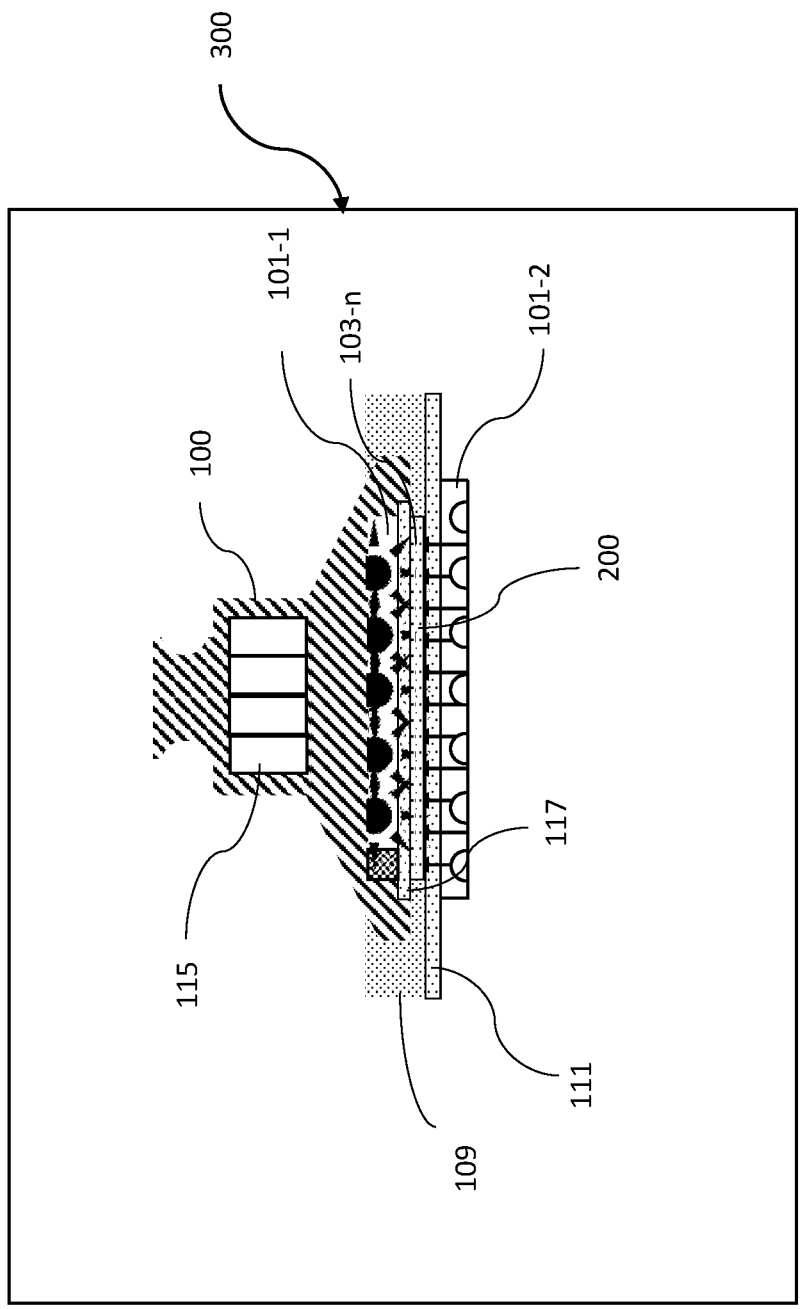
FIG. 3 shows a further schematic state of a building platform in a stereolithography method.

FIG. 3 shows a further schematic state of the building platform 100 in a stereolithography method. The layer 103-n has been cured and adheres to the transparent surface 117 of the building platform 100. Subsequently, the building platform 100 is lifted and the remaining layers 103-n are built up. As the number of layers 103-n increases, the detected light intensity decreases. Once this is below the predetermined threshold or the counter has elapsed, the rear illumination device 101-1 is deactivated. As a result, it is possible to control the number and degree of polymerisation of required burn-in layers exactly, not to reduce the working life of the energy store 115 unnecessary, and to dispense with control by the printer.

The building platform 100 may comprise a counter which determines how many layers are to be illuminated at the rear side. In addition, a deflecting mirror 119 (as depicted in FIG. 1) may be provided, by means of which the light from the front illumination device 101-2 can be deflected directly onto the photosensor 105. The building platform 100 may also comprise a digital memory, in which the dimensions thereof, such as the height, are stored as a digital value. This digital value can be read out by the stereolithography device 300 so that the start position (0 position) of the building platform comprising the rear illumination unit with respect to the transparent base 111 can be calculated and set to the desired Z value.

Figure 4:
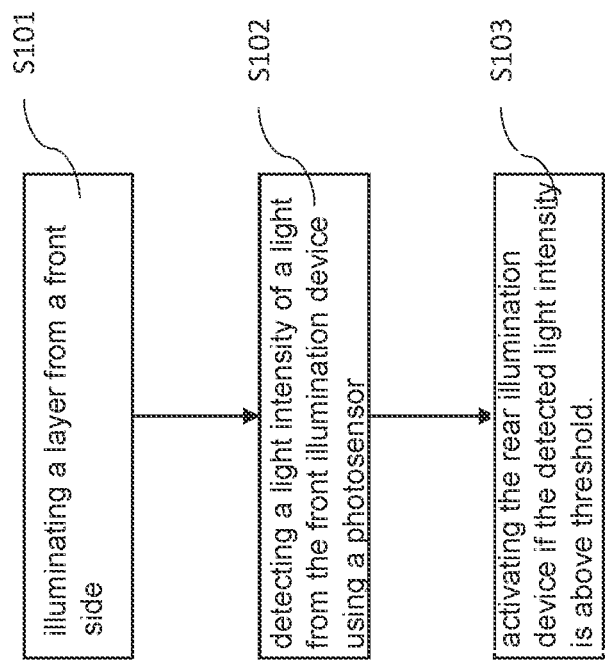
FIG. 4 is a block diagram of a method for building up the workpiece in layers or continuously.

FIG. 4 is a block diagram of a method for building up the workpiece 200 in layers using a building platform 100. In the first step S101, the layer 103-n is illuminated from a front side by the front illumination device 101-2. Subsequently, in step S102, the light intensity of the light from the front illumination device 101-2 is detected through the layer 103-n and/or the material 109 and/or via a deflecting mirror by a photosensor 105. In step S103, the rear illumination device 101-1 is activated by the control device 107 if the detected light intensity of the front illumination device 101-2 is above a predetermined threshold. If it is below the predetermined threshold, the rear illumination device 101-1 is deactivated.

The rear illumination device 101-1 can be activated for a predetermined number of layers 103-n. For this purpose, a counter may be provided which counts the number of built-up layers. For the building process, a height of the building platform 100 for the building process can be taken into account to determine the start position of the building platform 100 and to set a predetermined layer thickness of the layer 103-n.

The building platform 100 with integrated rear illumination device 101-1 can be retrofitted and operated without being electronically connected to the stereolithography device 300. The rear illumination device 101-1 is controlled or triggered via the integrated photosensor by standard mask illumination of the burn-in layers.

Control of the rear illumination device 101-1 is thus effectuated by means of the photosensor 105, which is triggered by the illumination of the front illumination device 101-1 of the base layers. The rear illumination device 101-1 can thus be controlled or switched on synchronously with the mask projection.

The rear illumination takes place temporarily for the first one to five layers 103, synchronously with the original illumination of the burn-in layers. The power supply takes place independently of the rest of the stereolithography device 300 by means of the energy store 115 integrated into the building platform 100.

As a result of the indirect control via the photosensor 105, the rear illumination device 101-1 can be activated without a mechanical probe and without an electrical connection to the rest of the stereolithography device 300. The energy store 115 makes an independent power supply possible, for which no external cable is required.

As standard, stereolithography devices 300, such as stereolithography printers, are often not equipped with a building platform 100 with rear illumination device 101-1 which is connected to a control system. The autonomous building platform 100 makes it possible to retrofit stereolithography devices 300, without having to modify them in hardware and/or in software. The retrofitted building platform 100 operates autonomously with respect to the printer control system and is merely controlled/triggered via the illumination of the front illumination device 101-2 in the building process.

All features described and shown in connection with individual embodiments of the invention may be provided in a different combination in the subject-matter according to the invention to implement the advantageous effects thereof concurrently.

All method steps may be implemented by devices suitable for carrying out the method step in question. All functions which are carried out by features relating to an apparatus can be a method step of a method.

The scope of protection of the present invention is specified by the claims and is not limited by the features described in the description or shown in the drawings.

In some embodiments, the stereolithography system may include suitable devices including, but not limited to, servers, network hosts, client computers, integrated circuits, microcontrollers, controllers, field-programmable-gate arrays, personal computers, or digital computers, an energy source, or a central processing unit (CPU) to execute (machine-readable) instructions to cause the devices to perform the aforementioned processes. Machine-readable instructions can be stored on a non-transitory, tangible machine-readable storage medium, which may manipulate and transform data represented as physical (electronic) quantities with the memories of the device in order to control the physical elements to create the 3D object.

In some embodiments, an energy source used in the process or system may be any source that may emit energy such as, but not limited to, IR, near-IR, UV, or visible curing lamps, IR, near-IR, UV, or visible light emitting diodes (LED), or lasers with specific wavelengths.

In some embodiments, the control device may include a central processing unit (CPU), a read only memory (ROM), a random access memory (RAM), an auxiliary storage unit, and a communication interface. The CPU can be connected to each unit through a system bus so as to transmit and/or receive data to and from each unit.

LIST OF REFERENCE NUMERALS

100 Building platform
101 Illumination device
103 Layer
105 Photosensor
107 Control device
109 Material
111 Base
113 LED
115 Energy store
117 Transparent surface
200 Workpiece
300 Stereolithography device

The invention claimed is:

1. A stereolithography method for building up a workpiece (200) in layers or continuously using a stereolithography printer including a building platform (100), comprising the steps of:
   illuminating (S101) a layer (103-n) from a front side using a front illumination device (101-2);
   detecting (S102) a light intensity of a light from the front illumination device (101-2) through the layer (103-n) and/or a material and/or via a deflecting mirror using a photosensor (105); and
   activating (S103) a rear illumination device (101-1) using a printer-independent control device (107) if the detected light intensity of the front illumination device (101-2) is above a predetermined threshold.

2. The method according to claim 1, wherein the rear illumination device (101-1) is activated for a predetermined number of layers and/or using an adjusted illumination duration for each layer.

3. The method according to claim 1, wherein a height of the building platform (100) is taken into account for the building process to determine the start position of the building platform (100) and to set a predetermined layer thickness of the layer (103-n).

4. A stereolithography method for building up a workpiece (200) in layers or continuously using a stereolithography printer including a building platform (100), comprising the steps of:
   detecting a layer using a detection device (105); and
   activating a rear illumination device (101-1) using a printer-independent control device (107) when the layer is detected.

5. The method according to claim 4, wherein the rear illumination device (101-1) is activated for a predetermined number of layers and/or using an adjusted illumination duration for each layer.

6. The method according to claim 4, wherein a height of the building platform (100) is taken into account for the building process to determine the start position of the building platform (100) and to set a predetermined layer thickness of the layer (103-n).

7. A building platform (100) for building up a workpiece (200) in layers or continuously by a stereolithography printer, comprising:
   a rear illumination device (101-1) for illuminating a layer (103-n) from a rear side;
   a photosensor (105) for detecting a light intensity of a light from a front illumination device (101-2) through the layer (103-n) and/or through a material and/or from deflection by a deflecting mirror; and
   a printer-independent control device (107) for activating the rear illumination device (101-1) when the detected light intensity of the front illumination device (101-2) is above a predetermined threshold.

8. The building platform (100) according to claim 7, wherein the rear illumination device (101-1) is formed by an LED matrix.

9. The building platform (100) according to claim 7, wherein the light intensity or illumination time of the rear illumination device (101-1) can be set using a potentiometer or by an internal control system, and/or the number of rear-illuminated layers (103-n) can be controlled using a counter.

10. The building platform (100) according to claim 7, wherein the building platform (100) comprises an electrical energy store (115) for storing energy for the rear illumination device (101-1).

11. The building platform (100) according to claim 10, wherein the energy store is a rechargeable battery, replaceable battery or both rechargeable and replaceable.

12. The building platform according to claim 7, wherein the photosensor (105) is a photodiode which is tuned to a wavelength range of the front illumination.

13. The building platform (100) according to claim 12, wherein the photodiode is sensitive in the wavelength range of the front illumination device in the UVA range or in the blue light range.

14. The building platform (100) according to claim 7, wherein the predetermined threshold for activating the rear illumination can be set by a user.

15. The building platform (100) according to claim 7, wherein the building platform (100) with the rear illumination device (101-1) can be inserted modularly into a stereolithography device (300) or the rear illumination device (101-1) can be modularly placed on or slid onto the building platform (100).

16. A stereolithography device (300) comprising the building platform according to claim 7.

17. The stereolithography device (300) according to claim 16, characterised in that the stereolithography device (300) is formed so that part of the light of the front illumination device, which is used for illuminating the first layer, is deflected onto the photosensor, and the rear illumination device is thus activated.

18. A building platform (100) for building up a workpiece (200) in layers or continuously by a stereolithography printer, comprising:
- a rear illumination device (101-1) for illuminating a layer (103-*n*) from a rear side;
- a detection device (105) for detecting the layer (103-1); and
- a printer-independent control device (107) for activating the rear illumination device (101-1) when the layer (103-1) is detected.

19. A stereolithography device (300) comprising the building platform according to claim 18.

* * * * *